United States Patent
Alon et al.

(10) Patent No.: US 10,616,235 B2
(45) Date of Patent: Apr. 7, 2020

(54) ON-DEMAND AUTHORIZATION OF ACCESS TO PROTECTED RESOURCES

(71) Applicant: DOME 9 SECURITY LTD., Tel Aviv (IL)

(72) Inventors: Zohar Alon, Tel Aviv (IL); Roy Feintuch, San Francisco, CA (US); Eyal Fingold, Kfar Saba (IL)

(73) Assignee: CHECK POINT PUBLIC CLOUD SECURITY LTD., Tel Aviv (IL)

( * ) Notice: Subject to any disclaimer, the term of this patent is extended or adjusted under 35 U.S.C. 154(b) by 499 days.

(21) Appl. No.: 15/165,670

(22) Filed: May 26, 2016

(65) Prior Publication Data

US 2017/0149786 A1    May 25, 2017

Related U.S. Application Data

(63) Continuation of application No. 62/259,711, filed on Nov. 25, 2015.

(51) Int. Cl.
*H04L 29/06* (2006.01)

(52) U.S. Cl.
CPC .................. *H04L 63/104* (2013.01)

(58) Field of Classification Search
CPC ...... H04L 63/10; H04L 63/08; H04L 63/1433
See application file for complete search history.

(56) References Cited

U.S. PATENT DOCUMENTS

| | | | |
|---|---|---|---|
| 5,887,131 A | 3/1999 | Angelo | |
| 5,949,882 A | 9/1999 | Angelo | |
| 7,058,806 B2 | 6/2006 | Smeets et al. | |
| 7,076,797 B2 | 7/2006 | Loveland | |
| 7,231,661 B1 | 6/2007 | Villavicencio et al. | |
| 7,356,837 B2 | 4/2008 | Asghari-Kamrani et al. | |
| 7,360,244 B2 * | 4/2008 | Coley | G06Q 20/027 705/79 |
| 7,496,954 B1 | 2/2009 | Himawan et al. | |
| 7,590,684 B2 * | 9/2009 | Herrmann | H04L 63/08 709/203 |
| 7,764,948 B2 | 7/2010 | Lee et al. | |
| 8,060,932 B2 | 11/2011 | Mohammed et al. | |
| 8,266,432 B2 | 9/2012 | Asghari-Kamrani et al. | |

(Continued)

OTHER PUBLICATIONS

Haiges, OAuth2: (tiny) Intro and Authorization Code Flow, Jun. 1, 2012, SAP Customer Experience Labs, pp. 1-5 https://labs.cx.sap.com/2012/06/01/oauth2-authorization-code-flow/ (Year: 2012).*

(Continued)

*Primary Examiner* — Ali S Abyaneh
*Assistant Examiner* — Shu Chun Gao
(74) *Attorney, Agent, or Firm* — Mark M. Friedman (57) ABSTRACT

A method and system for on-demand authorization of access to protected resources are presented. The method comprises associating a primary user device with at least one secondary user device, the primary device having access privileges at a first degree of privilege; changing any access privileges assigned to the primary user device for accessing protected resources to a lesser degree of privilege; and reinstating the access privileges of the primary user device to the first degree of privilege, upon receiving a verification message from the at least one secondary user device.

15 Claims, 4 Drawing Sheets

(56) References Cited

U.S. PATENT DOCUMENTS

| | | | |
|---|---|---|---|
| 8,528,052 B2 | 9/2013 | Lukach et al. | |
| 8,635,660 B2 | 1/2014 | Ng et al. | |
| 9,130,940 B2 | 9/2015 | Kamikawa | |
| 9,166,999 B1* | 10/2015 | Kulkarni | H04L 63/1433 |
| 9,300,671 B1* | 3/2016 | Barak | H04L 63/10 |
| 9,432,361 B2* | 8/2016 | Mahaffey | H04L 63/0853 |
| 9,438,604 B1* | 9/2016 | Addala | H04L 9/3226 |
| 9,787,654 B2* | 10/2017 | Vincent | H04L 63/06 |
| 9,912,648 B2* | 3/2018 | Taylor, III | H04L 63/08 |
| 9,967,742 B1* | 5/2018 | Belton, Jr. | H04L 9/32 |
| 10,057,227 B1* | 8/2018 | Hess | H04L 63/08 |
| 2002/0083340 A1 | 6/2002 | Eggebraaten et al. | |
| 2004/0268120 A1* | 12/2004 | Mirtal | G06F 21/10 |
| | | | 713/156 |
| 2006/0143447 A1* | 6/2006 | Vasishth | H04L 63/102 |
| | | | 713/166 |
| 2006/0241909 A1* | 10/2006 | Morgan | G06Q 10/06 |
| | | | 702/183 |
| 2012/0216241 A1* | 8/2012 | Alon | H04L 63/20 |
| | | | 726/1 |
| 2014/0245389 A1* | 8/2014 | Oberheide | H04L 63/0815 |
| | | | 726/3 |
| 2014/0282877 A1* | 9/2014 | Mahaffey | H04L 63/0853 |
| | | | 726/3 |
| 2016/0036807 A1* | 2/2016 | Knauss | G06F 16/9535 |
| | | | 726/7 |
| 2016/0337346 A1* | 11/2016 | Momchilov | H04W 12/0023 |
| 2017/0006044 A1* | 1/2017 | Ezra | H04L 63/102 |

OTHER PUBLICATIONS

Haiges, OAuth2: the Implicit Flow, aka as the Client-Side Flow, Jun. 5, 2012, SAP Customer Experience Labs, pp. 1-4 https://labs.cx.sap.com/2012/06/05/oauth2-the-implicit-flow-aka-as-the-client-side-flow/ (Year: 2012).*

* cited by examiner

ON-DEMAND AUTHORIZATION OF ACCESS TO PROTECTED RESOURCES

CROSS-REFERENCE TO RELATED APPLICATIONS

This application claims the benefit of U.S. Provisional Application No. 62/259,711 filed on Nov. 25, 2015, the contents of which are hereby incorporated by reference.

TECHNICAL FIELD

The present disclosure generally relates to access to networked resources, and more specifically to enhanced methods of access authorization to such networked resources.

BACKGROUND

Authorization is a method of specifying an entity's (e.g., a user, a service, a role) privileges with respect to accessing resources in a secured system or a network. Once the entity is identified and authenticated, access privileges of the authenticated entity are enforced. In most common cases, privileges given to the entity are a combination of several different actions on several different resources. Each such action may be classified differently. For example, some actions are more intrusive while others are less intrusive, and some resources have a higher degree of confidentiality or criticality while others have a lesser degree of confidentiality or criticality.

There are many mechanisms that try to unequivocally authenticate the entry to the secured system. However, in many cases, if hackers have access to the device used for authentication, it is possible to hijack the identity either permanently or temporarily and use the identity privileges to cause significant damage to the secured system and/or to access confidential information. Such damage may be evident shortly after a breach. However, in certain cases, it may take some time to identify such a security breach while the amount of damage caused continues to build.

Yet another common vulnerability is security misconfiguration of access privileges. Maintaining the proper access rights to each entity in general, and particularly in large scale systems to be secured, is practically an insurmountable challenge. That is, entities may unintentionally obtain access right simply due to a complex authorization hierarchy, grouping of entities, and more. The larger and more complex the system, the more likely it is for access errors to creep in and remain in the system. This may happen with or without a malicious intent. Such misconfiguration may thus cause unintended breaches and provide unauthorized access to the entity.

Regardless of whether a security system serves the purposes of information asset protection or provides general security outside the scope of information technology (IT), it is common to have three main security processes working together to provide access to assets in a controlled manner. The first is authentication, often referred to as Identification and Authentication, which is typically utilized for the purposes of determining and validating an entity's identity. The second is authorization, which is typically utilized to provide users with the access rights only to resources that they are eligible access. The third is accounting, also referred to as auditing, which provides an audit trail of a user's actions.

Each of those processes, while serving a specific goal, is based on the assumed validity and reliability of the previous step. Therefore, if an authentication device erroneously assumes that a given identity of an entity is authenticated properly, the authorization mechanism, being oblivious of an authentication failure, will allow an unauthorized entity to perform actions or get access to the resources it is meant to protect.

Existing solutions provide for many strong identification and authentication mechanisms like public key infrastructure (PKI), multi-factor authentication (MFA), cloud access security broker (CASB), and the like. However, if the device used to perform the identification/authentication is compromised, a malicious code or a hacker can hijack the identity of the entity temporarily or permanently and use that identity to perform actions or to gain access to resources which it is not approved to access.

Existing solutions are also vulnerable to other sorts of security breaches, such as breach of the communication channel, man-in-the-middle, session or cookie breaches, and more. Such a vulnerability may allow an authorized access to a protected resource. The risk is therefore clear, once a user is authenticated to access protected resources, the user may access these resources without a further check. Moreover, typically the authorization mechanism cannot differentiate between riskier actions or access to more confidential resources and less risky actions or access to lesser confidential resources. As a result, all resources may be subject to a heightened risk of breach, malicious or otherwise.

One of the challenges in authorization is that managing the privileges and, therefore, controlling access to resources of a system using security policies has grown. Researchers and system developers have simplified the administrative process by using groups of users who have the same authorizations. User groups were the precursor to role-based access control. Role-based access control (RBAC) systems group permissions into roles and requires all access to occur through the RBAC systems. Groups of permissions can then be readily provided to users in the simple operation of assigning roles. RBAC has been widely adopted and provides administrative and security advantages. However, as systems increase in size, RBAC has become harder, more complex, and more expensive to implement, as well as difficult to maintain. Therefore, misconfiguration of user privileges continues to occur frequently, thereby allowing users to gain unauthorized access to protected resources.

Other solutions attempt to tackle cases where a system is compromised, or an entity's privileges are misconfigured, allowing it to perform risky actions or access confidential information. As an example, one such solution is the second password for classified privileges on the same device. When entities try to access classified privileges or perform a risky action, the entity is prompted for a second password. This is very effective if combined with strong authentication or MFA, yet the logic of the authorization process is only enforced and performed in the original system and usually is embedded in some specific business flow. Typically, these are created by the solution provider rather than the user of the solution. Therefore, misconfigurations are still prone for error, and maintenance of the classified privileges is enforced in code/implementation.

Another existing solution includes the introduction of additional users authorizing classified privileges. When an entity needs to perform classified privileges or perform a risky action, the entity needs to receive an approval from another entity that needs to authenticate and approve this action. Therefore, if one entity is compromised, it is unable to create damage/expose confidential information on its own. The main disadvantage of this solution is the dependency on another entity, which may create a slow, somewhat bureaucratic process when a human must be involved, which is not suited for large-scale operations or other vital/real time systems. Further, this solution is limited to those capabilities integrated into the product by the solution provider.

Therefore, in view of the deficiencies of the existing solutions in providing reliable, simple and flexible solution to ensure that the effective and accurate authorizations to access protected resources, it would be beneficial to have a solution that overcomes these deficiencies.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. This summary's sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for on-demand authorization of access to protected resources. The method comprises associating a primary user device with at least one secondary user device, the primary device having access privileges at a first degree of privilege; changing any access privileges assigned to the primary user device for accessing protected resources to a lesser degree of privilege; and reinstating the access privileges of the primary user device to the first degree of privilege, upon receiving a verification message from the at least one secondary user device.

Certain embodiments disclosed herein also include a system for on-demand authorization of access to protected resources. The system comprises a processing system; a memory containing instructions that when executed by the processing system causes the system to: associate a primary user device with at least one secondary user device, the primary user device having access privileges at a first degree of privilege; change any access privileges assigned to the primary user device for accessing protected resources to a lesser degree of privilege; and reinstate the access privileges of the primary user device to the first degree of privilege, upon receiving a verification message from the at least one secondary user device.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

The various embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

By a way of example, the disclosed embodiments include a system and method for enhanced authorization for access to resources in a protected access system. The protected access system may include primary user devices (PUDs) accessing resources and performing actions to which the primary user devices have access rights thereto. An external authorization server (EAS) is configured to receive the rights, thereby allowing the external authorization server to restrict access to the resources and/or the actions permitted by the protected access system. The external authorization system may further change the authorizations such that all future authorizations have to be performed using the EAS. During registration of a PUD to the EAS, a secondary user device (SUD) is associated with the PUD for authorization purposes and all privileges in the protected system are changed to denial of service. Upon an attempt by the PUD to access a resource or perform an action that requires authorization, a process takes place requiring authorization using the SUD.

Figure 1:
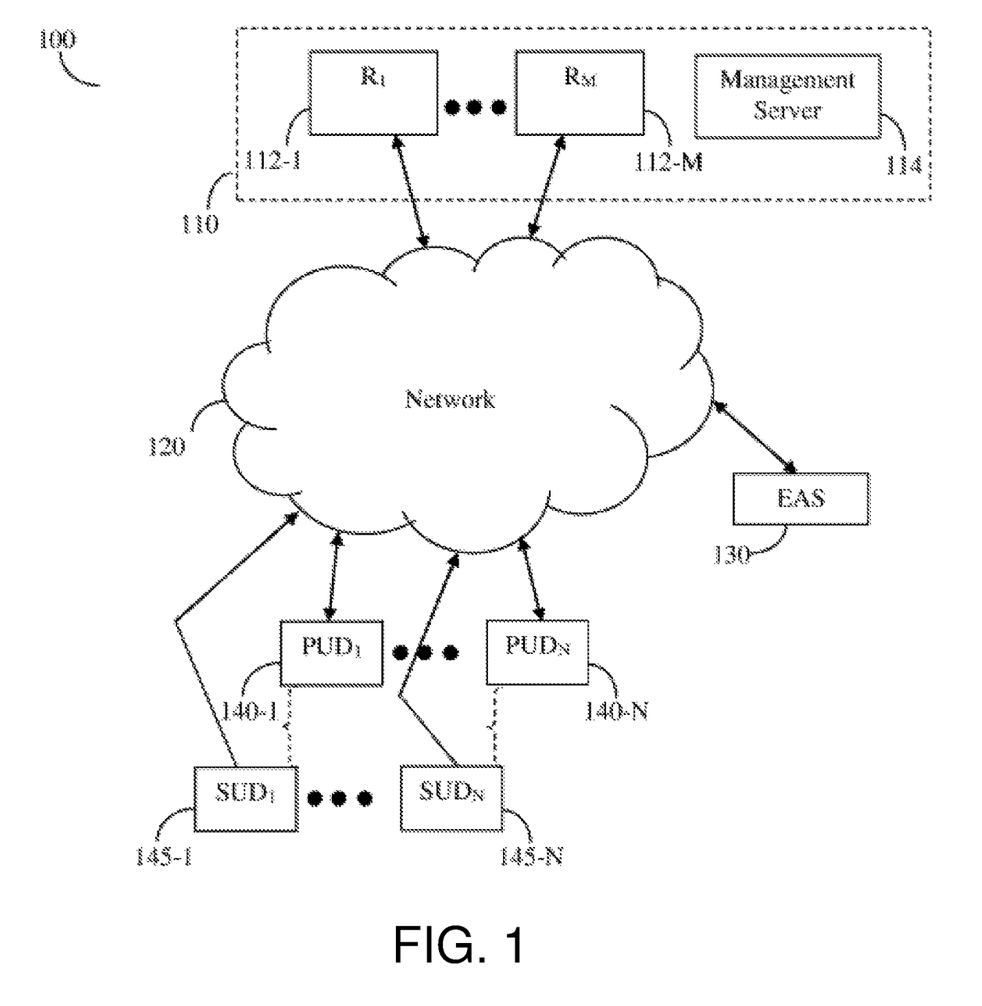
FIG. 1 is a network diagram of a system according to an embodiment.

FIG. 1 shows an example network diagram of a system 100 utilized to describe the various disclosed embodiments. To a network 120 there are communicatively connected various elements as further described herein. The network 120 includes, but is not limited to, a local area network (LAN), a wide area network (WAN), a metro area network (MAN), a wireless network, the world wide web (WWW), the Internet, and any combinations thereof.

A protected access system 110 is communicatively connected to the network 120 and includes a plurality of protected resources 112-1 through 112-M (hereinafter referred to individually as a protected resource 112 and collectively as protected resources 112, merely for simplicity purposes). The protected resources 112 may be, but are not limited to, servers, databases, network attached storage (NAS) devices, and the like. In an optional configuration, a management server 114 is used for the configuration and management of the protected access system 110. The management server 114 may be one of the resources 112. In an embodiment, the management server 114 is configured to provide, either directly or indirectly, authentication and authorization for the access to the protected access system 110. To this end, the management server 114 may be preconfigured with a set of rules and configurations that define accessibility to one or more of the protected resources 112.

According to the various disclosed embodiments, certain access attempts to protected resources 112 require additional authorization, which is provided via an external authorization server (EAS) 130. Requirements for external authorization by the EAS 130 may be detailed, in whole or in part, in the authorization rules or configurations of the management server 114 for any of the protected resources 112, or for any portions thereof. For example, reading data may require simple authorization, while modifying data in a protected resource 112 may require an external authorization by the EAS 130.

As shown in FIG. 1, primary user devices (PUDs) 140-1 through 140-n (hereinafter referred to individually as a PUD 140 and collectively as PUDs 140, merely for simplicity purposes), are communicatively connected to the network 120 and may attempt to access the resources 112 of the protected access system 100 as may be necessary. Each PUD 140 is further associated with a secondary user device (SUD) 145. It should be noted that, although the description herein is with respect to one SUD 145 associated with one PUD 140, it should be understood that each SUD 145 may be associated with more than one PUD 140 and that each PUD 140 may be associated with more than one SUD 145 without departing from the scope of the disclosed embodiments. Furthermore, it should be understood that the number of PUDs 140 and SUDs 145 does not have to be equal, and it is further possible that a specific PUD 140 may not have a SUD 145 associated thereto, and thus not enjoy the benefits of the second level authorization discussed herein.

In one embodiment, one PUD 140, for example, the PUD 140-3, may be defined as an SUD 145 for the purposes of secondary authorization for another PUD 140, for example the PUD 140-2. In another embodiment, the SUD 145 may be an integral part the SUD's 145 associated PUD 140. It should be noted that the disclosed embodiments may include all such configurations without departing from the scope of the disclosure, and that the embodiment seen in FIG. 1 is described with respect to each PUD 140 being associated with only a single SUD 145 merely for simplicity purposes and without limitations on the disclosure.

According to the disclosed embodiments, the EAS 130 is configured to perform an initial setup and registration process controlling access to the protected resources 112 of the protected access system 110. In an embodiment, the set of rules and/or configurations is provided to the management server 114, which in turn defines which of the protected resources 112 as well as which particular actions with respect to the protected resources 112 requires additional security authorization. The EAS 130 is further configured to change, add, or remove privileges of the PUDs 140 with respect to the protected resources 112 and actions thereon. For example, EAS-rules may define, for each PUD 140 with respect to each protected resource 112, unrestricted permission to access for the first level authorization, restricted permission to access only upon secondary authorization, and denial of access or action if no authorization is determined.

In an embodiment, EAS-rules may be configured manually, semi-automatically or fully automatically as the case may be. In manual configuration an operator of the system may input EAS-rules as deemed necessary. In a semi-automatic mode some but not all of the rules are provided automatically, for example, by receiving or extracting rules from the management server 114, while others are entered manually by an operator. In a fully automated EAS-rules definition all the rules are received or extracted from, for example, management server 114.

Upon activation of the EAS 130 and/or completion of the initial setup, the EAS 130 is configured to send invitations to the PUDs 140 when applicable, to register with the EAS 130. In an embodiment, when accessing for registration to the EAS 130, the registering PUD 140, for example, the PUD 140-1, provides a SUD 145 (e.g., the SUD 145-1), as a secondary authorization device. Upon registration of the PUD 140, the EAS 130 is configured to change the registration changes privileges to restricted permission to access only upon secondary authorization to a conditional denial, and noting by the EAS 130 that authorization may be granted upon authorization using the SUD 140.

The management server 114 can be implemented in hardware, software, firmware or any combination therefor. When implemented in hardware, the server 114 can be realized by one or more hardware logic components and circuits. An example implementation of the EAS 130 is discussed below with reference to FIG. 4.

Figure 2:
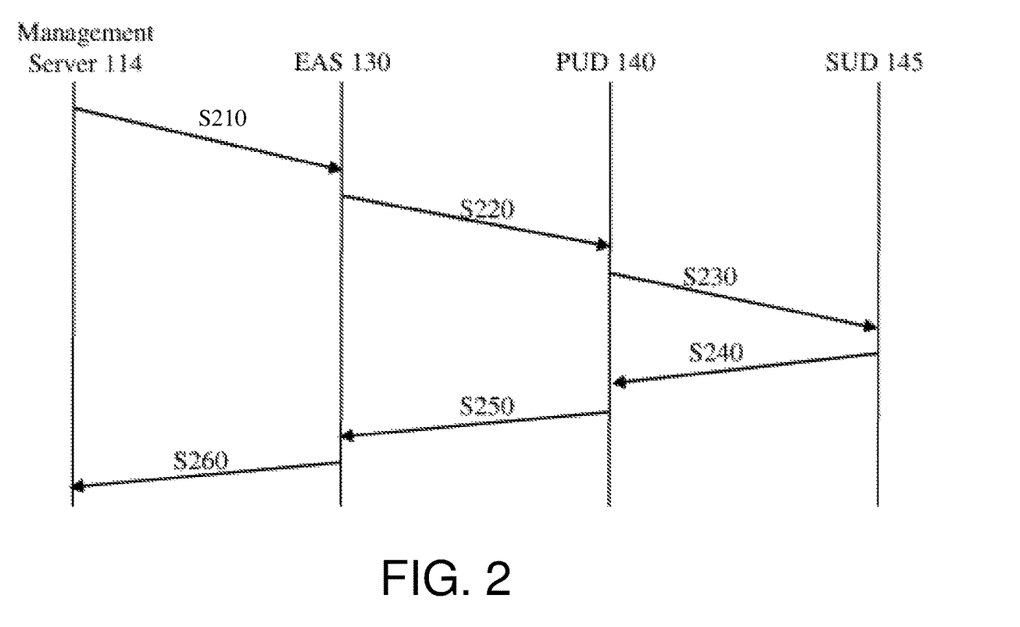
FIG. 2 is a communication diagram of a setup and registration process according to an embodiment.

FIG. 2 shows an example communication diagram of setup and registration according to an embodiment. The example communication diagram shown in FIG. 2 is described herein with respect to FIG. 1. At S210, the management server 114 enables the EAS 130 to change privileges provided to one or more of the protected resources 112 with respect to a PUD 140. The privileges may include, but are not limited to, access rights and/or actions to perform with respect to the protected resources 112.

At S220, the EAS 130 is configured to send an invitation to the PUD 140 to register for secondary authorization with the EAS 130. Then, at S230, the invitation is forwarded for processing to the SUD 145 associated with the PUD 140. In an embodiment, the SUD 145 is configured to perform the registration steps with the EAS 130 through the PUD 140. At S240 and S250, the registration of the SUD 145 is performed.

Upon registration, at S260, the EAS 130 is configured to initiate the replacement and updating of privileges of the PUD 140 with respect of the management server 114. Thereafter, any attempt to perform a direct access from the PUD 140 to a protected resource 112 restricted for access by the PUD 140 will be denied as it will be necessary to first authorize the transaction by the EAS 130 and change the privileges for the requesting PUD 140 as explained herein below.

The setup and registration process provides an on-demand, rather than static, policies; that is, the elevation of authorization and permission occurs only when it is needed, rather than at all times. During normal operation, a PUD 140 can request and access to a resource 112 on-demand through the PUD's 140 respective SUD 145. For example, an authorized PUD 140-1 can access only a protected resource 112-1 and perform respective actions based on the authorizations provided by the management server 114. That is, when the PUD 140-1 attempts to access a protected resource 112-M, such an access attempt would be denied. In order to allow access to the resource 112-M, the management server 114, noting the denial of access, sends a denial notification to the PUD 140-1. As a result, the PUD 140-1 initiates a secondary authorization by requesting the EAS 130, through its respective SUD 145-1, to perform the necessary authorization process. As part of this process, the EAS 130 is configured to update the authorizations for the PUD 140-1 and to inform the PUD 140-1 that access to the resource 112-M is now granted.

Typically, any authorization changes made by the EAS 130 are temporary. The changes may be expired and authorization will revert to the original authorization setting. The authorization change may be time dependent (e.g., providing a time period of lease), event dependent, or otherwise dependent on predetermined parameters and configurations of the EAS 130. The process for granting access on-demand is further described with respect to FIG. 3.

Figure 3:
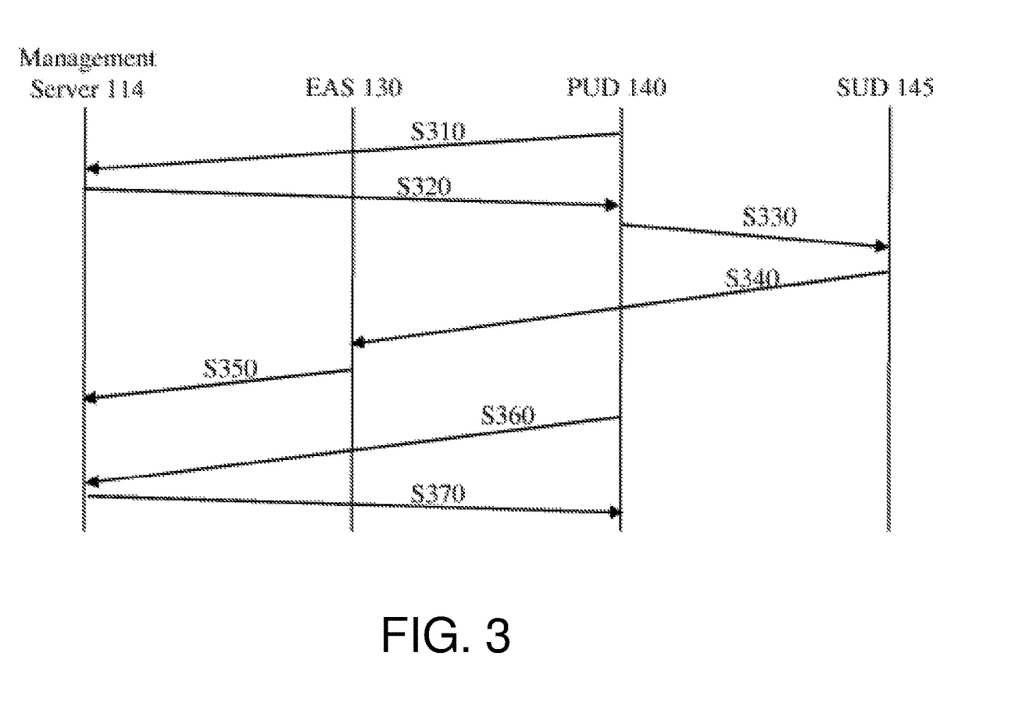
FIG. 3 is a communication diagram of a functioning system after the setup and registration process according to an embodiment.

FIG. 3 shows an example communication diagram 300 of a functioning system after setup and registration according to an embodiment. At S310, the PUD 140 attempts to access a resource 112. The access attempt is performed by requesting the management server 114 for access authorization.

At S320, the access attempt is denied by the management server 114 and the management server 114 notifies the PUD 140 of the denial. The access attempt is denied because the PUD 140 is not granted with the right privileges to access the resource 112.

At S330, a user of the PUD 140 wishing to receive access to the resource 112 initiates a request to the SUD 145 to begin a secondary authorization process. Responsive thereto, at S340, the SUD 145 sends an authorization request to the EAS 130. While the authorization request may be sent from the SUD 145, it may also be performed using another device, as discussed herein.

At S350, the EAS 130 authorizes the PUD 140 to access resource 112. To this end, the EAS is configured to update the authorization for the PUD 140 on the management server 114. In an embodiment, the changes in the authorization are temporary, and such authorization change would revert back to a denial when one or more conditions are met. At S360, requests for accessing the resource 112 are sent to the management server 114 by the PUD 140. At S370, the management server, now configured with a new authorization for the PUD 140, approves the access requests to the resource 112.

In an embodiment, certain risky actions or classified information are classified to remain protected in the case where the PUD used for authentication is compromised. This classification reduces the chance that both authentication devices, the PUD and SUD, become compromised. The on-demand authorization event disclosed herein further reduces the chances for error due to misconfiguration as access after the initial authorization is further confirmed, and in particular for access to sensitive resources 112, information thereon, or actions thereof.

It should be appreciated that, in the normal operating state, a PUD of an administrator user operates in a restricted mode. Only after an explicit external authorization process, according to embodiments described herein, are the permissions elevated. This reduces critical changes due to, for example, human error. It should be further appreciated that the authorization request may be treated as an audited event, providing additional security to such systems. Furthermore, a compromised administrator account, according to embodiments discussed herein, is now easy to detect as an attacker trying to do malicious operations will receive authorization denial errors that are easily monitored and/or alerted in real time when happening.

According to one embodiment, a user group may deny all critical resources as a matter of a policy. In this embodiment, the EAS is configured to add or remove users from within that group. As a result, if the EAS itself is compromised, there is no way for the attacker to elevate a PUD with a permission not originally provided. Because, according to the disclosed embodiments, the original permissions of the PUD are not modified or changed. Thus, in a worst case scenario, the original authorizations are available. This is further true when the EAS is configured or programmed with errors. Here, the EAS can never provide a PUD with higher access privileges than what the PUD originally had.

It should be noted that FIGS. 2 and 3 are described herein above with respect to FIG. 1 merely for simplicity purposes and without limitation on the disclosed embodiments. Other networked systems may be utilized without departing from the scope of the disclosure.

Figure 4:
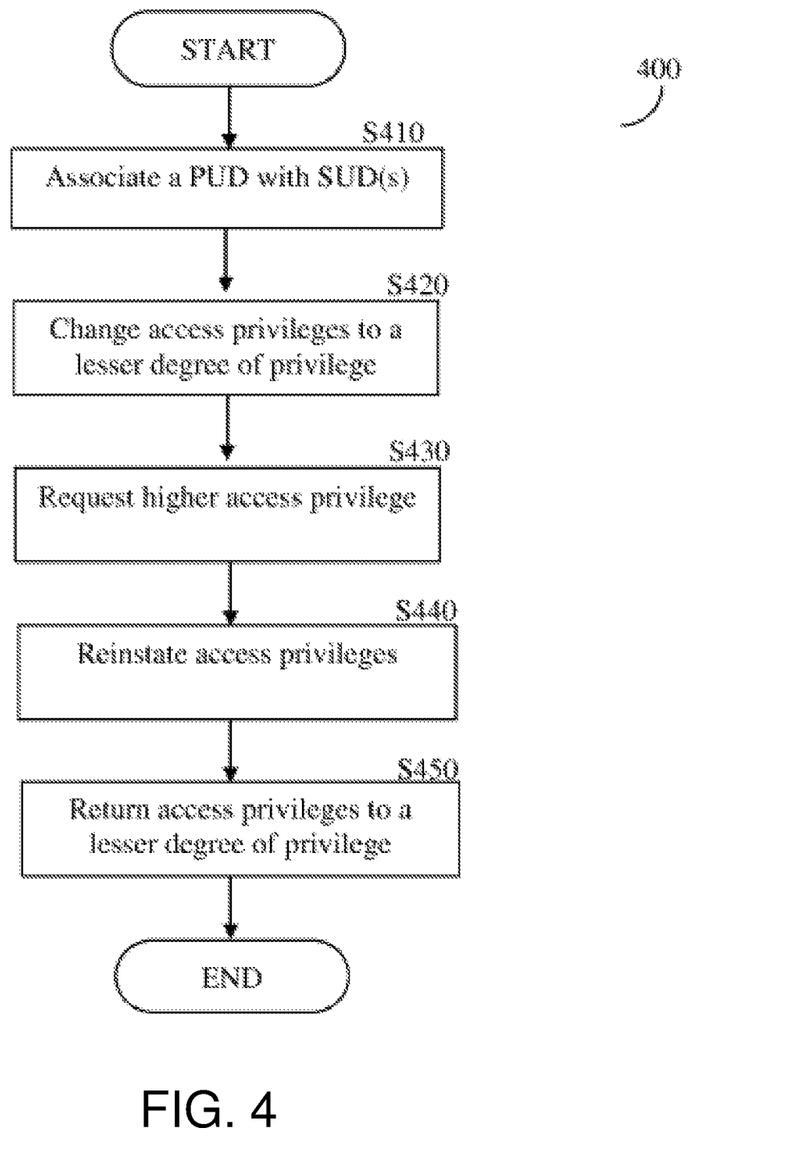
FIG. 4 is a flowchart of a method for an on-demand authorization of access to protected resources according to one embodiment.

FIG. 4 shows an example flowchart 400 of a method for an on-demand authorization of access to protected resources according to one embodiment. The method can be performed by a system (e.g., the EAS 130) external to a management server controlling access to protected resources. At S410, a PUD is associated with at least one SUD. The association is performed during the initial setup and registration process discussed in detail above. At S420, once the SUD is associated with a respective PUD, the access privileges assigned to the PUD for accessing one or more of the protected resources are set to a lesser degree of privilege. This lowered privilege of the PUD as compared to the SUD enforces access authorization through the SUD.

At S430, a request is sent from the PUD to the associated SUD for higher access privileges. In an embodiment a verification message is received from the SUD associated with the PUD. Such a request is generated in response to the authorization request issued by the PUD. The PUD requests for such authorization when the PUD is denied access to a protected resource.

At S440, upon receiving the verification message from the SUD, the access privileges of the PUD to the protected resource are reinstated to a higher degree of privilege. This change would enable the PUD to access the protected resource. In an embodiment, S430 includes configuring a management server controlling access to the protected resource to reinstate the access privileges. The higher degree of privilege may be temporarily.

Optionally, at S450, upon detection of an expiration event, the management server may revert the access privileges of the PUD to the lesser degree of privilege. The expiration event may be, but is not limited to, an expiration of a predefined time interval, an expiration of a lease, and the like.

Figure 5:
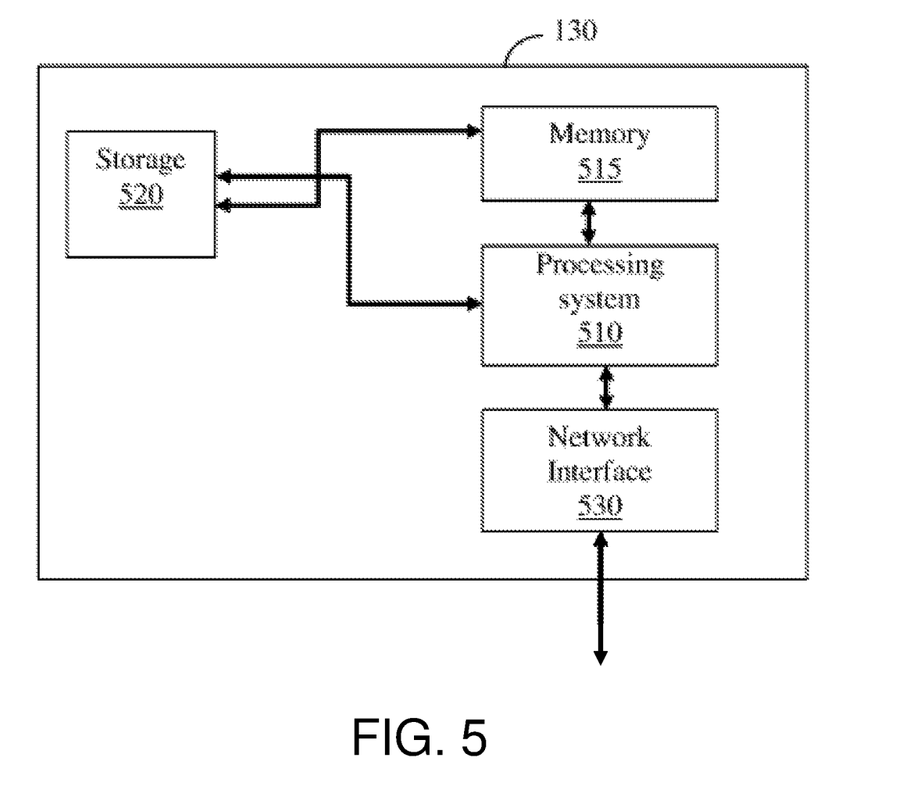
FIG. 5 is a block diagram of an external authorization server (EAS) implemented according to one embodiment.

FIG. 5 shows an example block diagram of the EAS 130 implemented according to one embodiment. The EAS 130 includes a processing system 510 coupled to a memory 515, a storage 520, and a network interface 530.

The processing system 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 510 to perform the various processes described herein. Specifically, the instructions, when executed, cause the processing system 510 to perform an on-demand authorization of access to protected resources, as discussed hereinabove.

The storage 520 may be magnetic storage, optical storage, and the like, and may be realized, for example, as flash memory or other memory technology, CD-ROM, Digital Versatile Disks (DVDs), or any other medium which can be used to store the desired information.

The storage 520 may also store a set of rules and configurations defining the access privileges for each PUD for each of the protected resources. The storage 520 may also store for each PUD respective associated SUD or SUDs.

The network interface 530 allows the EAS 130 to communicate with the protected access system 110 the protected access system's 110 management server 114, the PUDs and SUDs. In an embodiment, the network interface 530 allows remote access to the EAU 130 for the purpose of, for example, configuration, the EAS 130 with the different set of rules and configurations.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for on-demand authorization of access to a protected resource, comprising:
   (a) associating, by an external authorization server, a primary user device with at least one secondary user device, the primary user device having access privileges to access the protected resource at a first degree of privilege, the access privileges to the protected resource being under control of a management server that is separate and remotely located from the external authorization server;
   (b) changing, by the management server, any access privileges assigned to the primary user device for accessing the protected resource to a restricted privilege;
   (c) receiving, by the management server, a request from the primary user device for access to the protected resource at the first degree of privilege; and
   (d) upon receiving, by the management server, from the external authorization server an indication that the external authorization server received a verification message from the at least one secondary user device, the management server performing at least one of:
   (i) reinstating the access privileges of the primary user device to the first degree of privilege, (ii) maintaining the access privileges of the primary user device at the restricted privilege.

2. The method of claim 1, wherein associating the primary user device with the at least one secondary user device is performed through an initial setup and registration process.

3. The method of claim 2, wherein the initial setup and registration process further comprises: sending an invitation to the primary user device to register the secondary user device for secondary authorization; and registering the secondary user device as associated with the primary user device.

4. The method of claim 3, wherein changing the access privileges assigned to the primary user device is performed upon registration of the secondary user device.

5. The method of claim 4, wherein reinstating the access privileges of the primary user device further comprises: configuring a management server controlling access to the protected resource to temporarily reinstate the access privileges.

6. The method of claim 5, further comprising: configuring the management server to revert the access privileges of the primary user device to the restricted privilege, upon detection of an expiration event.

7. The method of claim 1, wherein the verification message is received from the at least one secondary user device in response to an authorization request issued by the primary user device.

8. A non-transitory computer-readable storage medium having embedded thereon computer-readable code for on-demand authorization of access to a protected resource, the computer-readable code comprising program code for:
   (a) associating, by an external authorization server, a primary user device with at least one secondary user device, the primary user device having access privileges to access the protected resource at a first degree of privilege, the access privileges to the protected resource being under control of a management server that is separate and remotely located from the external authorization server;
   (b) changing, by the management server, any access privileges assigned to the primary user device for accessing the protected resource to a restricted privilege;
   (c) receiving, by the management server, a request from the primary user device (PUD) for access to the protected resource at the first degree of privilege; and
   (d) upon receiving, by the management server, from the external authorization server an indication that the external authorization server received a verification message from the at least one secondary user device, the management server performing at least one of:
(i) reinstating the access privileges of the primary user device to the first degree of privilege,
(ii) maintaining the access privileges of the primary user device at the restricted privilege.

9. A system for on-demand authorization of access to a protected resource, comprising:
(a) a processing system;
(b) a memory containing instructions that when executed by the processing system causes the system to:
(i) associate, by an external authorization server, a primary user device with at least one secondary user device, the primary user device having access privileges to access the protected resource at a first degree of privilege, the access privileges to the protected resource being under control of a management server that is separate and remotely located from the external authorization server;
(ii) change, by the management server, any access privileges assigned to the primary user device for accessing the protected resource to a restricted privilege;
(c) receive, by the management server, a request from the primary user device (PUD) for access to the protected resource at the first degree of privilege; and
(d) upon receiving, by the management server, from the external authorization server an indication that the external authorization server received a verification message from the at least one secondary user device, the management server performing at least one of:
(i) reinstating the access privileges of the primary user device to the first degree of privilege,
(ii) maintaining the access privileges of the primary user device at the restricted privilege.

10. The system of claim 9, wherein the association of the primary user device with the at least one secondary user device is performed through an initial setup and registration process.

11. The system of claim 9, wherein the system is further configured to:
send an invitation to the primary user device to register the secondary user device for secondary authorization; and register the secondary user device as associated with the primary user device.

12. The system of claim 9, wherein changing the access privileges assigned to the primary user device is performed upon registration of the secondary user device.

13. The system of claim 12, wherein the system is further configured to: configure the management server to temporarily reinstate the access privileges.

14. The system of claim 13, wherein the system is further configured to: configure the management server to revert the access privileges of the primary user device to the restricted privilege, upon detection of an expiration event.

15. The system of claim 9, wherein the verification message is received from the at least one secondary user device in response to an authorization request issued by the primary user device.

* * * * *